(12) United States Patent
Aggarwal et al.

(10) Patent No.: US 6,408,295 B1
(45) Date of Patent: Jun. 18, 2002

(54) SYSTEM AND METHOD OF USING CLUSTERING TO FIND PERSONALIZED ASSOCIATIONS

(75) Inventors: Charu C. Aggarwal, Yorktown Heights; Philip Shi-lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/334,764

(22) Filed: Jun. 16, 1999

(51) Int. Cl.[7] .............................................. G06F 17/30
(52) U.S. Cl. ..................... 707/6; 702/2; 702/3; 702/7
(58) Field of Search .............................. 707/2, 3, 6, 7; 706/47

(56) References Cited

U.S. PATENT DOCUMENTS

| | | | | |
|---|---|---|---|---|
| 6,049,797 A | * | 4/2000 | Guha et al. ..................... | 707/6 |
| 6,138,117 A | * | 10/2000 | Bayardo ........................ | 707/6 |
| 6,263,327 B1 | * | 7/2001 | Aggarwal et al. ............. | 706/47 |
| 6,301,575 B1 | * | 10/2001 | Chadha et al. ................. | 707/2 |

OTHER PUBLICATIONS

R. Agrawal, et al., "Fast Discovery of Association Rules", Advances in Knowledge Discovery and Data Mining. AAAI/MIT Press, Chapter 12, pp. 307–328. Proceedings of the 20th International Conference on Very Large Data Bases, pp. 487–499, 1994.

R. Agrawal, et al., "Automatic Subspace Clustering of High Dimensional Data for Data Mining Applications", Proceedings of the ACM SIGMOD International Conference on Management of Data, Seattle, Washington, 1998.

M. Ester, et al., "A Database Interface for Clustering in Large Spatial Databases", Proceedings of the first International Conference on Knowledge Discover and Data Mining, 1995.

M. Ester, et al., "A Density Based Algorithm for Discovering Clusters in Large Spatial Databases with Noise", Proceedings of the 2nd International Conference on Knowledge Discovery in Databases and Data Mining, Portland, Oregon, Aug. 1996.

D. Gibson, et al., "Clustering Categorical Data: An Approach Based on Dynamical Systems", Proceedings of the 24th VLDB Conference, pp. 311–322, 1998.

S. Guha, et al., "Cure: An Efficient Clustering Algorithm for Large Databases", Proceedings of the 1998 ACM SIGMOD Conference pp. 73–84, 1998.

R. Kohavi, et al., "Feature Subset Selection Using the Wrapper Method: Overfitting and Dynamic Search Space Topology", Proceedings of the First International Conference on Knowledge Discovery and Data Mining, 1995.

R. Ng et al., "Efficient and Effective Clustering Methods for Spatial Data Mining", Proceedings of the 20th International Conference on Very Large Data Bases, Santiago, Chile, 1994, pp. 144–155.

(List continued on next page.)

Primary Examiner—Diane D. Mizrahi
(74) Attorney, Agent, or Firm—Scully, Scott, Murphy & Presser; Gail H. Zarick, Esq.

(57) ABSTRACT

A system and method for developing association rules which are personalized for a customer. The method includes partitioning (clustering) a set of records corresponding to transactions of items into discrete segments so that different parts of the data show different kinds of trends. The clustering is used in order to create a segmentation of the data such that these trends are captured in each segment. Consequently, a different set of association rules are relevant for each segment. For a given customer, the segment to which he/she belongs most closely may be readily determined, and the trends in that segment may be used for generating the association rules.

29 Claims, 6 Drawing Sheets

OTHER PUBLICATIONS

T. Zhang, et al., "BIRCH: An Efficient Data Clustering Method for Very Large Databases", Proceedings of the ACM SIGMOD International Conference on Management of Data, Montreal, Canada, Jun. 1996.

R. Agrawal, et al., "Mining Association Rules between Sets of Items in Large Databases", Proceedings of the ACM SIGMOD Conference on Management of data, pp. 207–216, 1993.

S. Brin, et al., "Dynamic Itemset Counting and implication rules for Market Basket Data", Proceedings of the ACM SIGMOD, 1997, pp. 255–264.

J. Han, et al., "Discovery of Multi–level Association Rules from Large Databases", pp. 420–432, Zurich, Switzerland, Sep. 1995.

H. Mannila, "Efficient algorithms for discoverying association rules", AAAI Workshop on Knowledge Discovery in Dtabases, 1994, pp. 181–192.

J. S. Park, et al., "An Effective Hash–Based Algorithm for Mining Association Rules", Proceedings of the ACM SIGMOD Conference on Management of Data, 1995, pp. 175–186.

A. Savasere, et al., "An Efficient Algorithm For Mining Association Rules in Large Databases", Proceedings of the 21st International Conference on Very Large Databases, 1995, pp. 432–444.

R. Srikant, et al., "Mining Generalized Association Rules", Proceedings of the 21st Internaitonal Conference on Very Large Data Bases, 1995, pp. 407–419.

R. Srikant, et al., "Mining Quantitative Association Rules in Large Relational Tables", Proceedings of the ACM SIGMOD Conference on Management of Data, 1996, pp. 1–12.

H. Toivonen, et al., "Sampling Large Databases for Association Rules", Proceedings of the 22nd International Conference on Very Large Databases, Bombay, India, Sep. 1996, pp134–145.

"Basic Abstract Data Types", Chapter 2, pp. 37–53.

D. H. Fisher, "Knowledge Acquisition Via Incremental Conceptual Clustering", Machine Learning 2: 139 172, 1987 Kluwer Academic Publishers, Boston. Manufactured in The Netherlands.

B. Lent, et al., "Clustering Association Rules" Department of Computer Sceience, Stanford University, Stanford, CT, pp. 220–231.

* cited by examiner

SYSTEM AND METHOD OF USING CLUSTERING TO FIND PERSONALIZED ASSOCIATIONS

BACKGROUND OF THE INVENTION

1. Field of the Invention

The present invention relates generally to systems and methods for generating association rules for describing relationships among items in a database, and particularly, to a system and method implementing skew of data included in a database of sales transactions for determining personalized association rules.

2. Discussion of the Prior Art

Association rules are generated to find the relationships between different items in a database of transactions, e.g., a sales transaction. A sales transaction is a set of items purchased by a given consumer at one time. Such rules track the buying patterns of consumers, e.g., finding how the presence of one item in a transaction affects the presence of another and so forth. The problem of association rule generation has recently gained considerable prominence in the data mining community because of its potential as an important tool for knowledge discovery.

Given I={i1, i2, ... , im} as a set of binary literals called items, each transaction T is a set of items, such that T is a subset of I. This corresponds to the set of items which a consumer may buy in a basket transaction. An association rule is a condition of the form X==>Y where X and Y are two sets of items. The idea of an association rule is to develop a systematic method by which a user may infer the presence of some sets of items, given the presence of other items in a transaction. Such information is useful in making decisions such as customer targeting, shelving, and sales promotions.

An important approach to the association rule problem was developed by Agrawal, et al., such as described in the reference by Agrawal R., Imielinski T., and Swami A., entitled "Mining Association Rules Between Sets of Items in Very Large Databases," Proceedings of the ACM SIGMOD Conference on Management of Data, pages 207,216, 1993 (Agrawal et al.). As described, the term SUPPORT of a rule X==>Y is defined as the fraction of transactions which contain both X and Y. The CONFIDENCE of a rule X==>Y is the fraction of transactions containing X, which also contain Y. Thus, if a rule has 90% confidence, then it means that 90% of the tuples containing X also contain Y. The approach taken by Agrawal et al. is a two-phase large itemset approach implemented as follows: 1) the first step is to generate all combinations of items that have fractional transaction support above a certain user-defined threshold called MINSUPPORT; these combinations are herein referred to as LARGE ITEMSETS. Given an itemset X={i1, i2, ... , ik}, it may be used to generate at most k rules of the type [S-{ ir}]==>ir for each r in {1, ... k}. Once these rules have been generated, only those rules above a certain user defined threshold called MINCONFIDENCE may be retained. The most computationally intensive part of the association rule problem is that of finding large itemsets. The second step of actually generating the rules is relatively straightforward.

Initially, the method was proposed only for the case of transaction data however, further research has been devoted to speeding up the algorithm and extending the approach to other scenarios such as described in the following references: Agrawal et al. R., Imielinski T., and Swami A., "Mining Association Rules Between Sets of Items in Very Large Databases,"Proceedings of the ACM SIGMOD Conference on Management of Data, pages 207,216, 1993; Agrawal R., Mannila H., Srikant, R., Toivonen H., and Verkamo A. I., "Fast Discovery of Association Rules", Advances in Knowledge Discovery and Data Mining, AAAI/MIT Press, Chapter 12, pages 307–328, and, Proceedings of the 20th International Conference on Very Large Data Bases, pages 487–499, 1994; Brin S., Motwani R., Ullman J. D., and Tsur S., "Dynamic Itemset Counting and implication rules for Market Basket Data", Proceedings of the ACM SIGMOD, 1997, pages 255–264; Han J. And Fu Y., "Discovery of Multi-level Association Rules From Large Databases", Proceedings of the International Conference on Very Large Databases, pages 420–431, Zurich, Switzerland, September 1995; Lent B., Swami A., and Widom J., "Clustering Association Rules", Proceedings of the Thirteenth International Conference on Data Engineering, pages 220–231, Birmingham, U.K., April 1997; Mannila H., Toivonen H., and Verkamo A. I., "Efficient Algorithms for Discovering Association Rules", AAAI Workshop on Knowledge Discovery in Databases, 1994, pages 181–192; Park J. S., Chen M. S., and Yu, P. S., "An Effective Hash-based Algorithm for Mining Association Rules", Proceedings of the ACM SIGMOD Conference on Management of Data, 1995; Savasere A., Omiecinski E., and Navathe S. B., "An Efficient Algorithm for Mining Association Rules in Large Databases", Proceedings of the 21st International Conference on Very Large Databases, 1995; Srikant R., and Agrawal R., "Mining Generalized Associate Rules", Proceedings of the 21st International Conference on Very Large Data Bases, 1995, pages 407–419; Srikant R., and Agrawal R., "Mining Quantitative Association Rules in Large Relational Tables", Proceedings of the ACM SIGMOD Conference on Management of Data, 1996, pages 1–12; and, Toivonen H., "Sampling Large Databases for Association Rules", Proceedings of the 22nd International Conference on Very Large Databases, Bombay, India, September 1996.

Another area of research to which this invention is related is referred to as clustering. The problem of clustering is that of segmenting the data into groups of similar objects. The problem of finding clusters in high dimensional data has been discussed in the following references: R. Agrawal, J. Gehrke, D. Gunopolos and P. Raghavan, "Automatic Subspace Clustering of High Dimensional Data for Data Mining Applications", Proceedings of the ACM SIGMOD International Conference on Management of Data, Seattle, Wash., 1998; M. Ester, H. -P. Kriegel and X. Xu, "A Database Interface for Clustering in Large Spatial Databases," Proceedings of the First International Conference on Knowledge Discovery and Data Mining, 1995; M. Ester, H. -P. Kriegel, J. Sander and X. Xu, "A Density Based Algorithm for Discovering Clusters in Large Spatial Databases with Noise", Proceedings of the 2nd International Conference on Knowledge Discovery in Databases and Data Mining, Portland, Ore., August 1996; R. Kohavi and D. Sommerfield, "Feature Subset Selection Using the Wrapper Method: Overfitting and Dynamic Search Space Topology", Proceedings of the First International Conference on Knowledge Discovery and Data Mining, 1995; S. Guha, R. Rastogi and K. Shim, "CURE: An Efficient Clustering Algorithm for Large Databases", Proceedings of the 1998 ACM SIGMOD Conference, pages 73–84, 1998; R. Ng and J. Han, "Efficient and Effective Clustering Methods for Spatial Data Mining", Proceedings. of the 20th International Conference on Very Large Data Bases, Santiago, Chile, 1994, pages 144–155; and, T. Zhang, R. Ramakrishnan and M. Livny, "BIRCH: An Efficient Data Clustering Method for Very Large Databases", Proceedings of the ACM SIGMOD International Conference on Management of Data, Montreal, Canada, June 1996.

The clustering and data segmentation techniques described in the prior art have heretofore never been applied for the purpose of generating personal association rules for customers.

Thus, it would be highly desirable to provide a system and method for finding personalized association rules by segmenting the data into groups of similar records, and using this segmentation in order to find the personalized rules. The motivation in finding personalized association rules is that e-commerce merchants are able to track buying behavior of customers using the online sales transaction data. This data may be used to determine association rules which are specific to each individual customer and thus, may be used as a tool for performing target marketing for that customer.

SUMMARY OF THE INVENTION

The present invention is directed to a technique for finding personalized association rules that exploits the skew in data, i.e., the local characteristics of the data, in order to generate itemsets used to create personalized association rules.

According to the invention, there is provided a system and method for developing association rules which are personalized for each customer by partitioning (clustering) a set of records into discrete segments. The key motivation of this method is that different parts of the data may show different kinds of trends and, the clustering is used in order to create a segmentation of the data such that these trends are captured in each segment. Thus, a different set of association rules are relevant for each segment. That is, for a given user, the segment to which he/she belongs most closely may be readily determined, and the trends in that segment may be used for generating the association rules. The process of finding the segmentation and itemsets are interweaved into a single algorithm.

The present invention is useful in target marketing, as associations may be found in each segment of the data.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
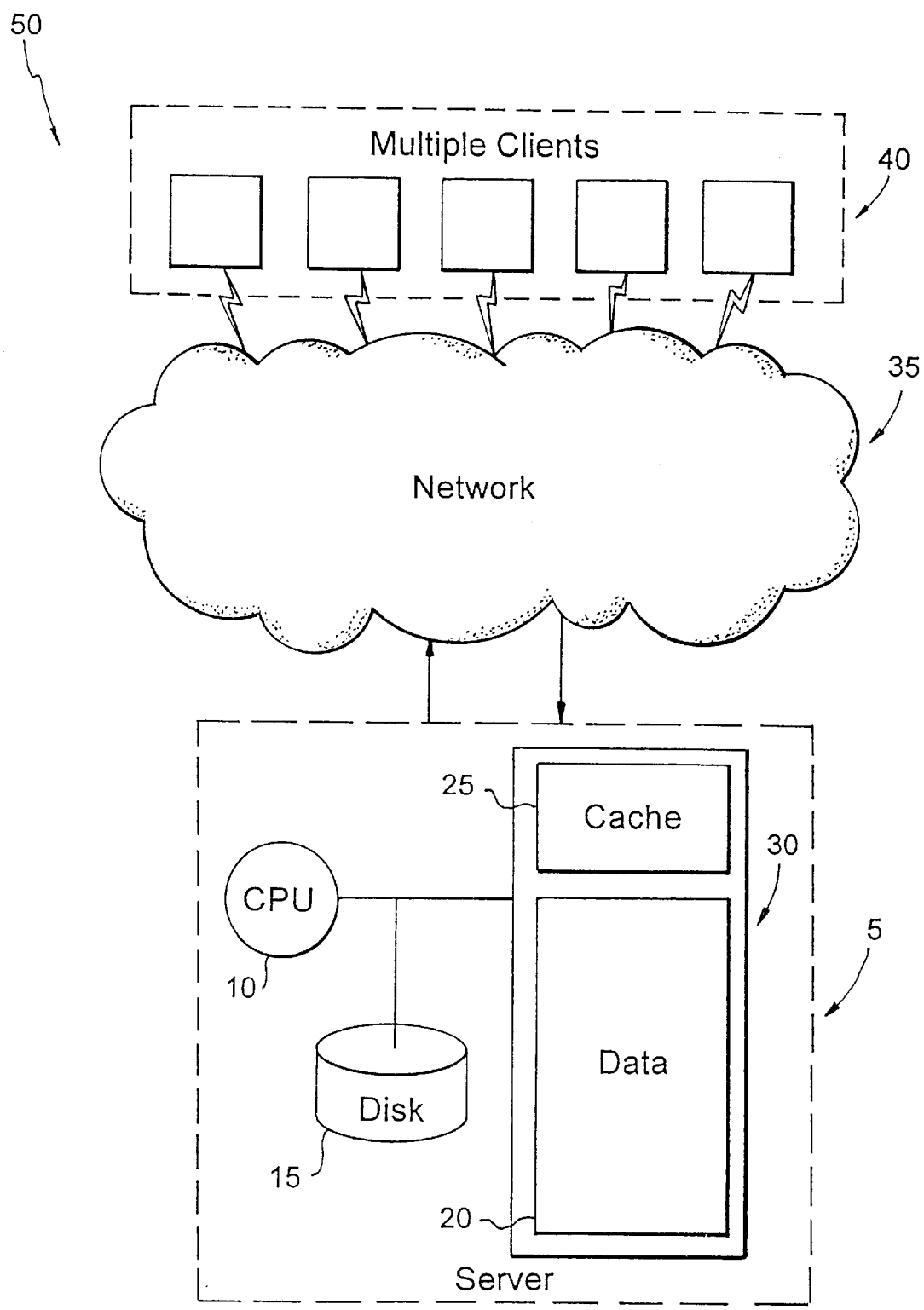
FIG. 1 is an illustration of the system architecture for implementing the present invention.

The system architecture 50 for carrying out the methodology of the invention is illustrated in FIG. 1. As shown in FIG. 1, the system includes server 5 comprising a central processing unit (CPU) 10, with the data maintained at the server 5 either in main memory 20 or on a disk 15. In addition, a memory cache 25 is available for improving data processing performance according to conventional techniques. Data maintained at the server 5 may be accessed and used by multiple clients, represented as computer terminals or workstations 40, over a network 35, e.g., Ethernet or like equivalent, for the purpose of finding personalized association rules.

A description of some of the notations and terminology used in the methodology of the invention are now described. As mentioned, each transaction in the database is represented as a vector of items together with the corresponding frequencies. For example, consider the case when the universe of all items is (Bread, Butter, Milk, Jam, Cheese, Tea). For a customer A who purchases Butter with frequency 2, Milk with frequency 3, and Jam with frequency 1, the "vector space" representation of the items bought by the customer A is given by (0, 2, 3, 1, 0, 0). In real applications, the total length of the vector may be of the order of a few thousand items, and most of the components in this vector are zero hence, making the data very sparse. It is possible to design list data structures which take advantage of the sparseness of these vectors as described in A. V. Aho, J. E. Hopcroft, and J. D. Ullman, "Data Structures and Algorithms", Addison Wesley Publishing Company, pages 34–52 (1983), reprinted with corrections 1987.

The "concatenation" of two transactions is the sum of the individual components of the vector space representation of the two customers. Thus, considering a customer B whose corresponding vector space representation consists of Bread (2), Jam (3), Tea (1), then, in this case, the vector space representation of the transactions bought by customer B is given by (2, 0, 0, 3, 0, 1). The CONCATENATION of the transactions corresponding to customers A and B is given by the sum of the individual components of these vectors and, the vector created by a concatenation of transactions is referred to as a META-TRANSACTION. Therefore, in this particular case, the concatenation results in the creation of the vector (0+2, 2+0, 3+0, 1+3, 0+0, 0+1)=(2, 2, 3, 4, 0, 1). A PROJECTION of a transaction or meta-transaction is defined by setting the least frequency terms in the transaction to 0. Thus, for a desired projection of n items, the weights of all items except the n terms with largest weight is set to 0. The CENTROID of a set of transactions is defined to be the meta-transaction created by the concatenation of the different transactions. A measure of the SIMILARITY between two transactions (represented by vectors X and Y) is additionally defined as follows: Cosine $(x, Y)=(X.Y)/(|X|.|Y|)$ with the numerator equal to the dot product of the vectors X and Y (multiplication of like items in each vector X and Y having a non-zero frequency) and the denominator equal to the modulo X multiplied by modulo Y. Thus, for each of the above example for customers A and B, the cosine between the two transactions is defined by $1·3/(\sqrt{14} · \sqrt{14})=3/14$, i.e., the numerator is the dot product, and the denominator of each is the modulo of each vector, e.g., modulo of both vectors A and B is $\sqrt{(2^2)+(3^2)+(1^2)}=\sqrt{14}$. It is understood that the resultant value (<1) is the measure of the similarity, with vectors closest to the value 1 indicating the strongest similarity.

Figure 2:
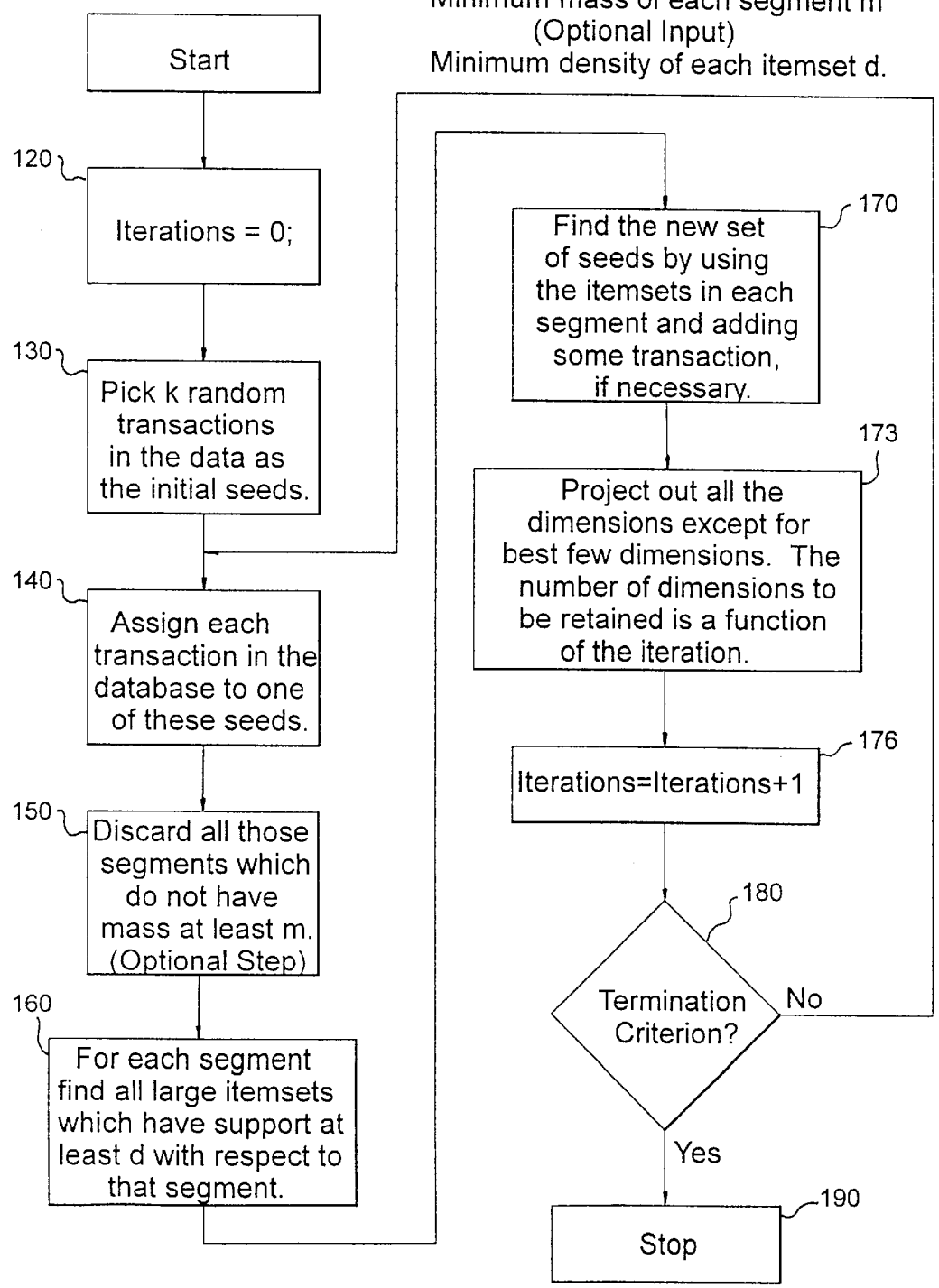
FIG. 2 is a process flow diagram illustrating the methodology for finding personalized association rules of the present invention.

The overall methodology 100 of the invention is now shown with respect to FIG. 2. According to the invention, various inputs parameters are needed and are defined as follows:

(1) Number of segments "k" which represents the number of segments in which the data is to be divided in order to perform the generation of personalized association rules; (2) Minimum mass of each segment "m" which represents the minimum number of database points, i.e., transactions, which must be present in each segment. This input, however, is optional and may be omitted, if necessary; and, (3) Minimum density "d" which represents all the itemsets found in a segment such that their support is at least a certain fraction of the mass of that localized segment. This fraction is equal to density. Thus, if q(i) is the mass of segment i, then the overall support of an itemset from segment i is at least equal to q(i)·d.

As will be described, the method 100 of the invention is an iterative process of building clusters by interactively improving and refining transaction "seeds" (vectors). Thus, a first step indicated at step 120 of FIG. 2, requires initializing a variable for tracking the number of iterations, i.e., set the variable to 0. Next, at step 130, a number "k" of random transactions are selected from the database as the initial seeds around which the clusters are to be built. The method then assigns each transaction in the database to one of these seeds at step 140, thus, creating a partition (or segmentation) of the database in which there are a total of "k" segments. At step 150, all those segments which do not have mass at least "m," are optionally discarded. This step may be desired to be performed only when the minimum mass requirement is present and, to ensure that seeds which result in clusters whose mass is less than m are not used. As support is defined with respect to number of transactions in a segment, i.e., the density, then at step 160, a determination is made of all the large itemsets in each segment having a support of at least "d" with respect to that segment. Several methods exist for finding large itemsets from transaction data such as described in commonly-owned, co-pending and pending U.S. patent application Ser. No. 09/253,243 entitled DEPTH FIRST METHOD FOR GENERATING ITEMSETS, the contents and disclosure of which is incorporated by reference as if fully set forth herein. Next, at step 170, a new set of seeds for all the segments with critical mass of at least "m" is found by using the large itemsets in that segment, and adding some transactions, if necessary. Specifically, for each segment, a seed is created which is the meta-transaction constructed by concatenating the transactions in that segment, i.e., the seed for a segment with mass larger than m is replaced by the seed created by concatenating the maximal itemsets in that segment. Thus, the centroid of the maximal itemsets in a segment is used in order to replace the new set of seeds in that segment as will be hereinafter described in greater detail with respect to FIG. 5. Note that in the optional step 150, some of the segments might already have been discarded if their mass was less than m. In order to compensate for this, some extra transactions may be added from the database in order to recreate a total of k seeds. At step 173, all the dimensions from each seed are projected out, except for the best few dimensions. The number of dimensions retained is a function of the iteration. In the first few iterations, it is desirable to retain a larger number of dimensions, whereas in later iterations, the number of dimensions to be retained is gradually reduced. Next, the value of the iterations variable is incremented by 1 at step 176, and at step 180, a termination criterion is checked. Typically, the termination criterion may be implemented in several ways. For example, the method may be terminated when a prespecified number of iterations have been executed. Alternately, it may be possible to terminate after the algorithm is close to convergence which is reached when the objective function is not improved significantly after a prespecified number of iterations.

Figure 3:
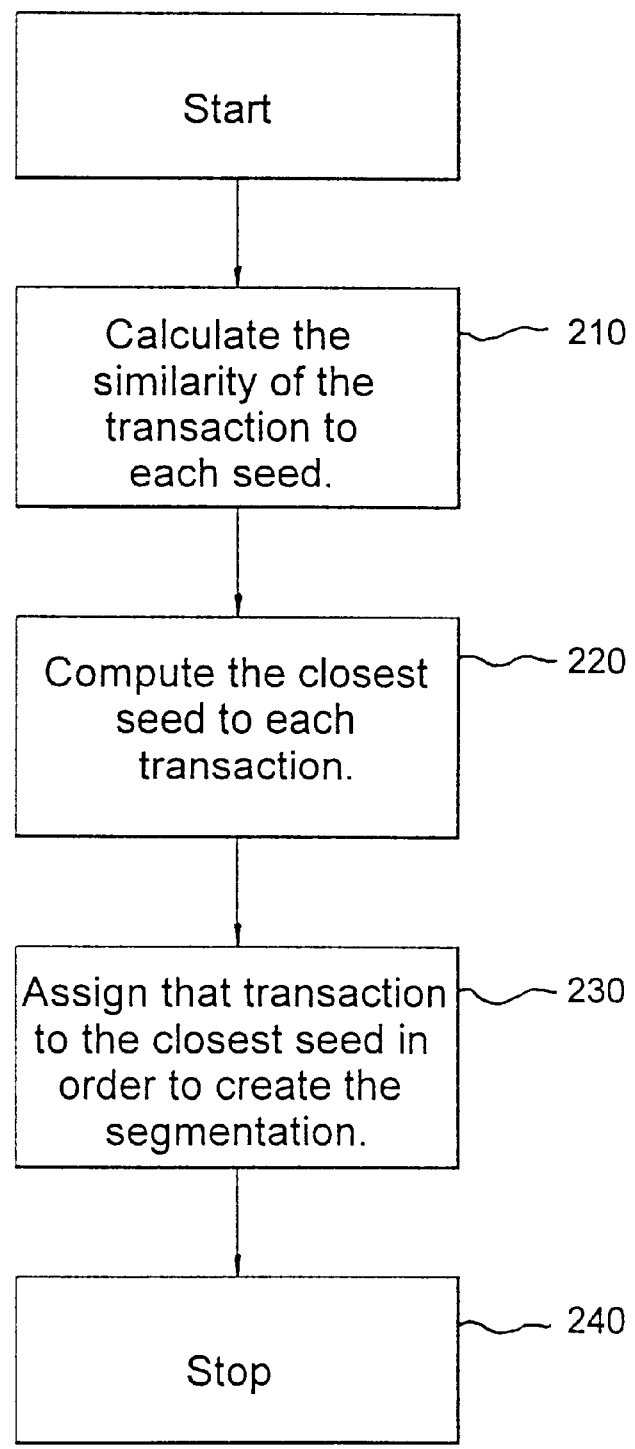
FIG. 3 is a process flow diagram illustrating the methodology for finding the proper assignments of the points in the database to each seed.

The process of assigning the transactions to seeds at step 140 is now described in greater detail with respect to FIG. 3. In FIG. 3, at step 210, the similarity of the transactions to each seed is calculated using the above-described cosine measure. These similarity measures are used in order to compute the closeness of a transaction to each of the seeds. At step 220, the closest seed is computed to each transaction and, the transaction is then assigned to the closest seed in order to create the segmentation, as indicated at step 230. This segmentation is then returned as the final set of clusters.

Figure 4:
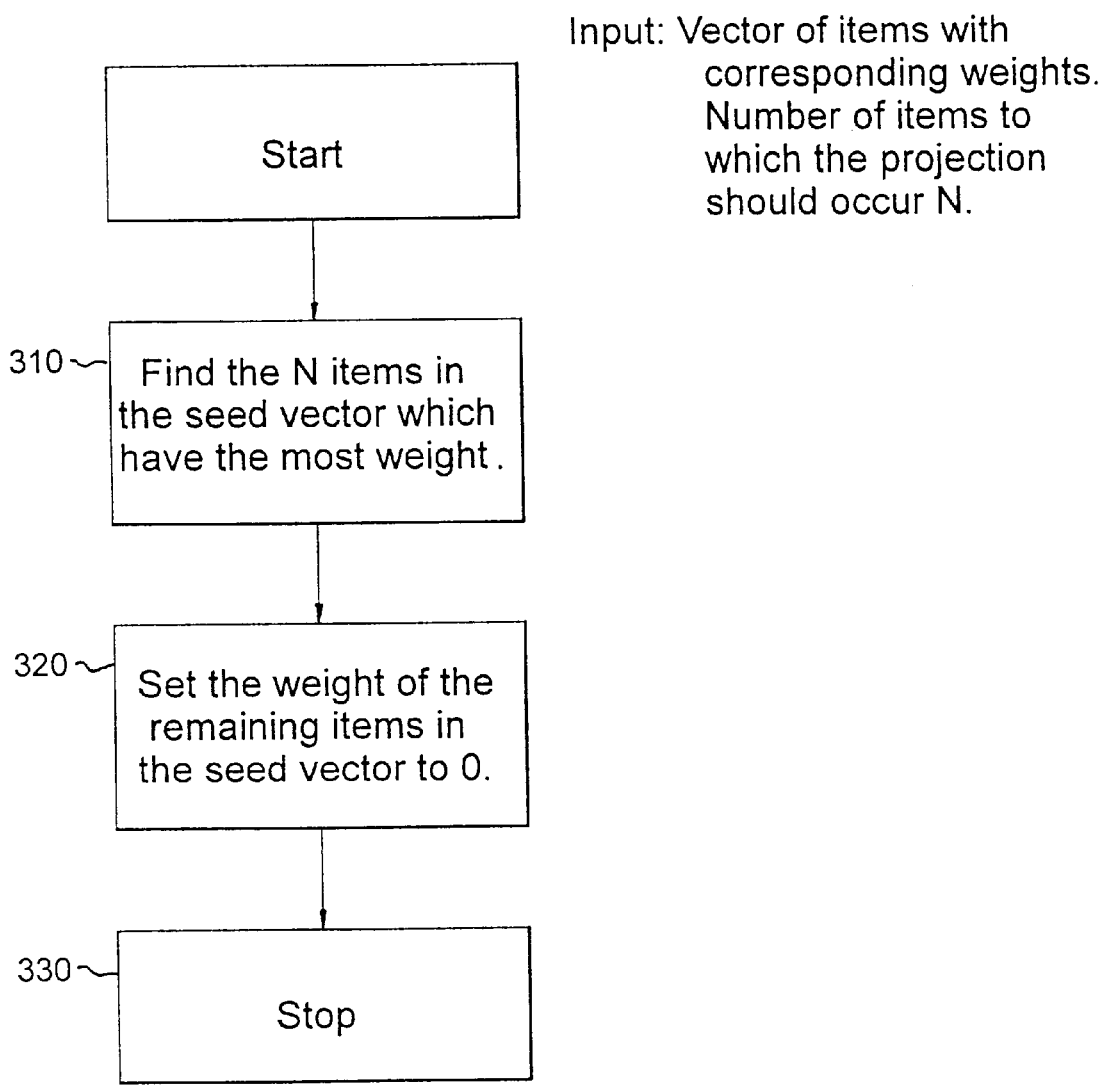
FIG. 4 is a flow diagram illustrating the process of performing projections on the seed vectors.

The process for projecting the seed vector to a small number of items as indicated at step 173 (FIG. 2) is now described in greater detail with respect to FIG. 4. Specifically, at step 310, the N items in the seed vector are found which have the maximum weight. The weight of the remaining terms in the seed vector is set to 0 at step 320. The resulting seed vector is returned as the final result. Thus, the overall effect of the process in FIG. 3 is to project the seed vector in such a way that only the highest weight terms in the seed are retained.

Figure 5:
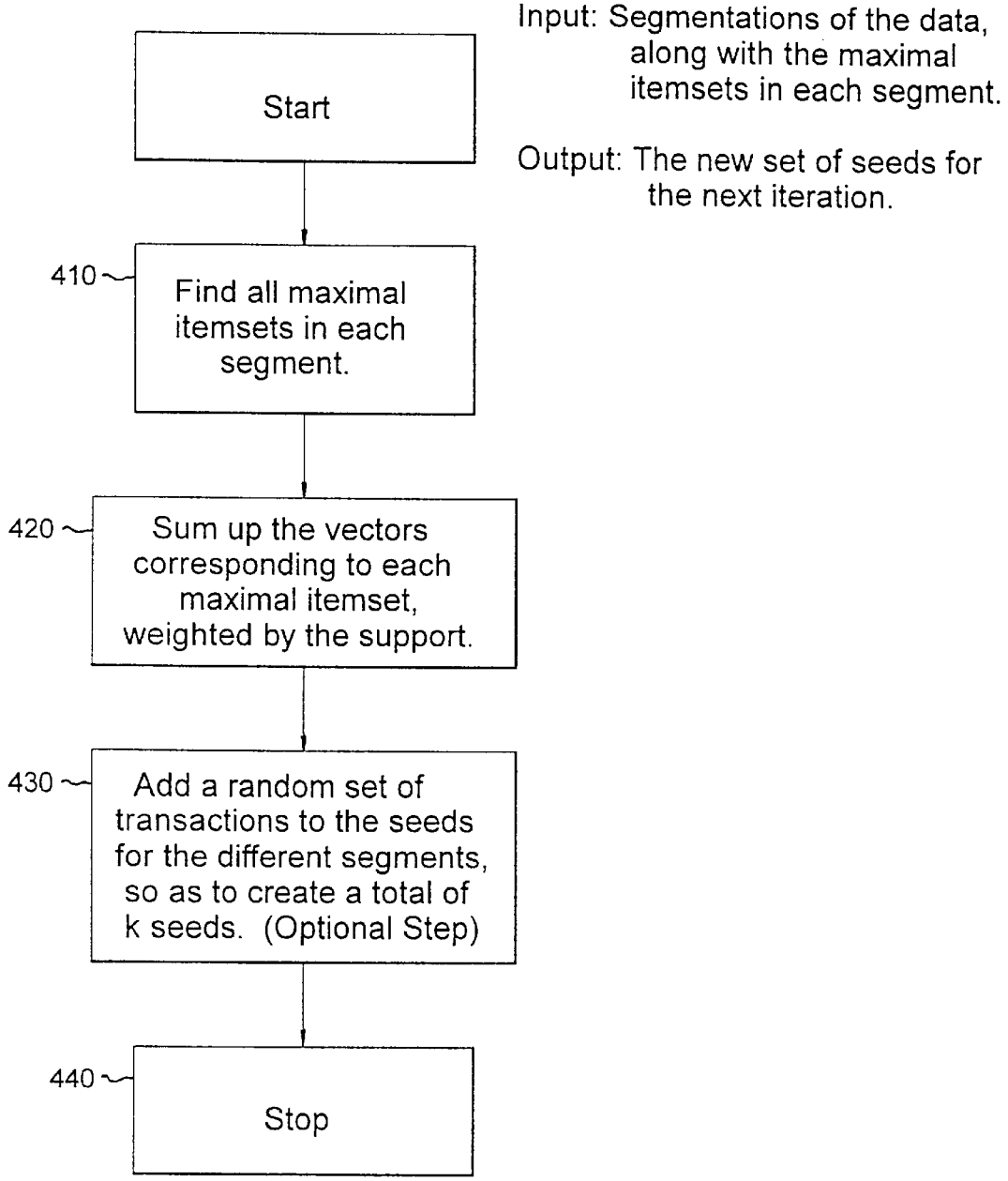
FIG. 5 is a process flow diagram illustrating the process for determining a new set of seeds using the itemsets in each segment.

The process for creating a new set of seeds for each segment as indicated at step 173 (FIG. 2) is now described in greater detail with respect to FIG. 5. First, as indicated at step 410, all the maximal itemsets in a given segment are found. A large itemset is said to be a maximal large itemset, when no superset of it is also a large itemset. In order to create the new set of seeds for each segment, the centroid of the set of maximal large itemsets is computed in each segment. That is, as indicated at step 420, a summation is performed of all the vectors corresponding to each maximal itemset when weighted by the support. Finally, at step 430, a random set of transactions is added to the current set of seeds in order to replace those seeds which were lost in the optional step 150. That is, this step is necessary in order to ensure that a total of k seeds exist, if the optional input of minimum mass is specified (which, in turn, causes the optional step 150 to be executed).

Figure 6:
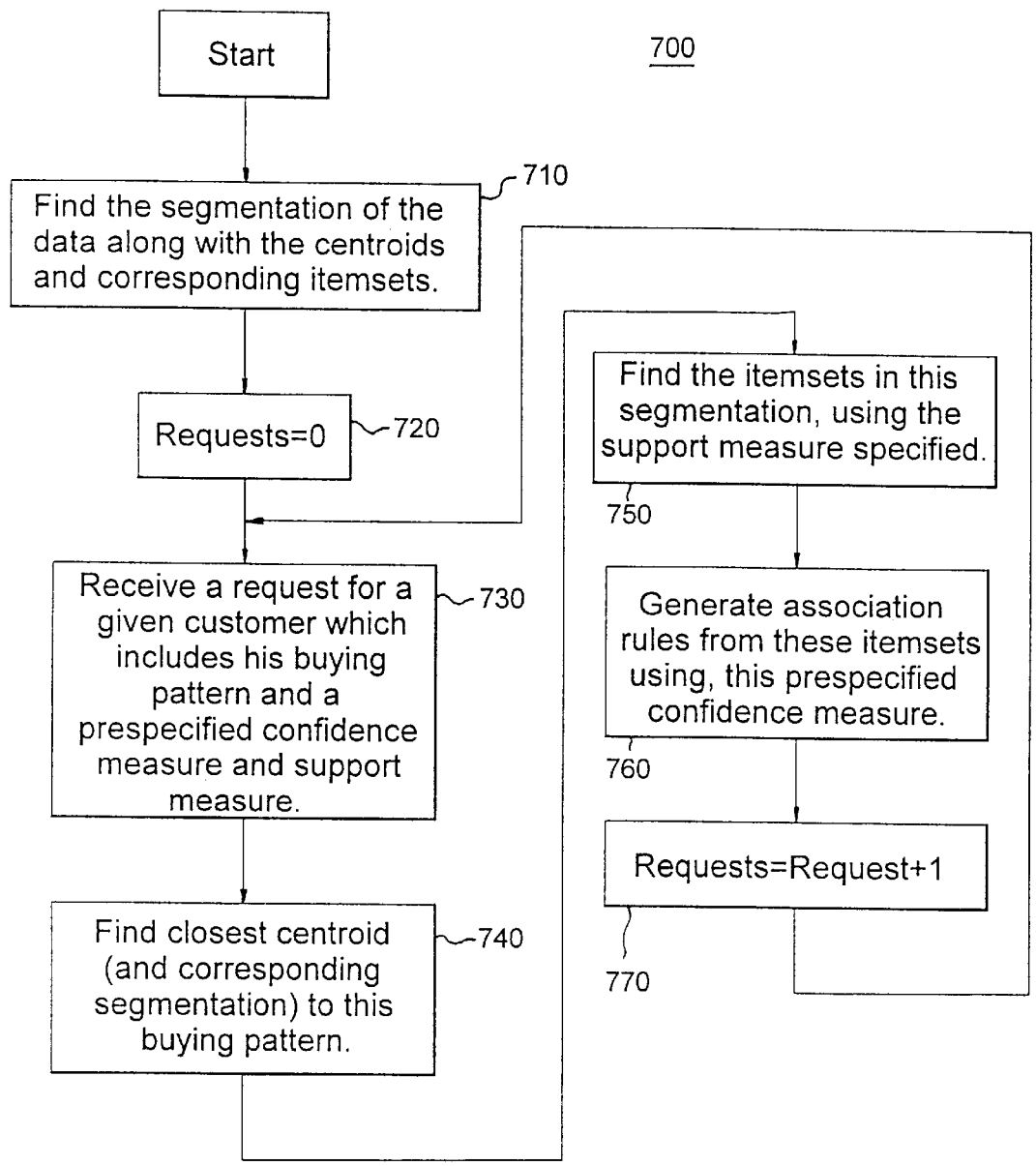
FIG. 6 is a process flow diagram illustrating how the method may be used in order to provide personalized itemsets (or association rules) for customers according to the method of FIG. 2.

FIG. 6 illustrates the method for implementing the segmentation technique in order to find personalized associations. The overall methodology is to first find the segmentation using the methods discussed in FIG. 2 as a preprocessing step, and then use this segmentation in order to find associations. As indicated at step 710, the segmentation of the data along with the centroid and corresponding itemsets in each segment is first found. Once this step has been completed, dynamic requests for each customer may be received in order to find the corresponding rules at a prespecified confidence measure. A counter, referred to in FIG. 6 as a variable "Requests," is implemented for keeping track of the number of requests which have been processed so far, and at step 720, this counter is initialized to 0. At step 730, a request for a given customer may be received, which includes that customer's buying pattern and a prespecified confidence and support measure. At step 740, a determination is made as to the closest centroid to that customer's buying pattern, i.e., finding the closest transaction to the centroid by using the herein described cosine similarity metric or other like similarity metric. The segmentation provided for this centroid is used in order to provide the personalized association rules. Thus, as indicated at step 750, the itemsets for this segmentation are found using the support measure provided by the customer. These itemsets may be generated using any of the techniques discussed in the prior art for generating association rules from itemsets (See, for example, above-mentioned Agrawal et al.). Next, at step 760, the association rules are found for each segmentation using the confidence measure specified by the customer. These are the set of association rules reported for that customer. In step 770, the counter Requests is incremented by 1, and the process returns back to step 730 to receive the next customer's request.

A trivial example for generating a personalized association rule according to the method of the invention is now provided. Considering a customer who has the transaction comprising the following items {Bread, Butter, Milk}: a centroid which is closest to the transaction is first found. As described, associated with this centroid are certain transactions corresponding to the cluster. For example, these transactions include: {Bread, Butter, Cheese}, {Bread, Milk}, {Butter, Milk, Cheese}, {Bread, Butter, Jam}. At a density of fifty percent (50%), the following itemsets are found: {Bread, Butter}, {Butter, Milk}, {Bread}, {Butter}, {Milk}. This is because at least two (2) of the four (4) transactions in the cluster contain these items. In addition, at a confidence of sixty percent (60%), the following rules are determined for this customer:

Bread==>Butter

Milk==>Butter

Note that the Butter==>Bread and Butter==>Milk do not meet the confidence threshold of sixty percent (60%).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for generating personalized associations of items organized as a plurality of transactions, each transaction comprising itemnsets having one or more items capable of forming said associations, said system comprising:
    (a) means for clustering itemsets from said plurality of transactions according to a user-specified number of cluster segments and a minimum density of each itemset in the segment;
    (b) means for receiving requests for a given customer, a request including a customer's buying patter; and,
    (c) means for generating personalized association rules in accordance with a received request, said personalized association rules generated from the cluster segment having items most relevant to the customer buying pattern provided in the received request.

2. The system according to claim 1, wherein said clustering means includes a computing device for implementing a partitioning algorithm, said algorithm invoking an iterative process for determining the different segments.

3. The system according to claim 2, wherein the generating means includes means for finding a centroid of a cluster segment that most closely matches a customer buying pattern, said generating means generating the itemsets and association rules which are most specific to this segment.

4. The system according to claim 3, wherein said iterative process consists of determining an initial set of seeds, each seed comprising a randomly selected transaction around which a cluster is to be built, determining similarity of a transaction to a seed and assigning a transaction to a most closely matched seed, and iteratively refining sets of seeds for building said cluster segments.

5. The system according to claim 4, wherein the process of refining sets of seed includes projecting out the least frequent items from the seed.

6. The system according to claim 5, wherein a number of the least frequent items to be projected from a seed is a function of the iteration.

7. The system according to claim 4, wherein said clustering means further imposes a minimum mass requirement for retaining cluster segments, and discarding all those cluster segments which do not satisfy said minimum mass requirement.

8. The system according to claim 4, wherein the itemsets in each segment are used in order to determine a centroid of that segment and refine the seeds in an iterative process.

9. The system according to claim 1, wherein said received request includes a specified support and confidence measure, said personalized association rules generated in accordance with said specified support and confidence measure.

10. A method for generating personalized associations of items organized as a plurality of transactions, each transaction comprising itemsets having one or more items capable of forming said associations, said method comprising:
    (a) clustering itemsets from said plurality of transactions according to a users specified number of cluster segments and a minimum density of each itemset in the segment;
    (b) receiving requests for a given customer, a request including a customer's buying pattern; and,
    (c) generating personalized association rules in accordance with said received request said personalized association rules generated from the cluster segment having items most relevant to the customer buying pattern provided in the received request.

11. The method according to claim 10, wherein said clustering step includes implementing an iterative process for determining the different segments.

12. The method according to claim 11, wherein the generating step includes finding a centroid of a cluster segment that most closely matches a customer buying pattern, and generating the itemsets and association rules which are most specific to this segment.

13. The method according to claim 12, wherein said iterative process comprises steps of:
    determining an initial set of seeds, each seed comprising a randomly selected transaction around which a cluster is to be built,
    determining similarity of a transaction to a seed;
    assigning a transaction to a most closely matched seed; and
    iteratively refining sets of seeds for building said cluster segments.

14. The method according to claim 13, wherein said refining step includes the step of projecting out the least frequent items from the seed.

15. The method according to claim 14, wherein a number of the least frequent items to be projected from a seed is a function of the iteration.

16. The method according to claim 13, wherein said clustering step includes retaining cluster segments according to a minimum mass requirement, and discarding all those cluster segments which do not satisfy said minimum mass requirement.

17. The method according to claim 13, further including determining a centroid of a segment using itemsets contained in said segment and refining the seeds in an iterative process.

18. The method according to claim 16, wherein said refining step includes the step of redistributing transactions in cluster segments below said minimum mass requirement to different clusters exceeding said minimum mass requirement.

19. The method according to claim 10, wherein said received request includes a specified support and confidence measure, said personalized association rules generated in accordance with said specified support and confidence measure.

20. A program storage device readable by a machine, tangibly embodying a program of instructions executable by the machine to perform method steps for generating personalized associations of items organized as a plurality of transactions, each transaction comprising itemsets having one or more items capable of forming said associations, said method steps comprising:

(a) clustering itemsets from said plurality of transactions according to a user-specified number of cluster segments and a minimum density of each itemset in the segment;

(b) receiving requests for a given customer, a request including a customer's buying pattern; and, (c) generating personalized association rules in accordance with said received request, said personalized association rules generated from the cluster segment having items most relevant to tire customer buying pattern provided in the received request.

21. The program storage device readable by a machine according to claim 20, wherein said clustering step includes implementing an iterative process for determining the different segments.

22. The program storage device readable by a machine according to claim 21, wherein the generating step includes finding a centroid of a cluster segment that most closely matches a customer buying pattern, and generating the itemsets and association rules which are most specific to this segment.

23. The program storage device readable by a machine according to claim 22, wherein said iterative process comprises steps of:

determining an initial set of seeds, each seed comprising a randomly selected transaction around which a cluster is to be built, determining similarity of a transaction to a seed;

assigning a transaction to a most closely matched seed; and iteratively refining sets of seeds for building said cluster segments.

24. The program storage device readable by a machine according to claim 23, wherein said refining step includes the step of projecting out the least frequent items from the seed.

25. The program storage device readable by a machine according to claim 24, wherein a number of the least frequent items to be projected from a seed is a function of the iteration.

26. The program storage device readable by a machine according to claim 23, wherein said clustering step includes retaining cluster segments according to a minimum mass requirement, and discarding all those cluster segments which do not satisfy said minimum mass requirement.

27. The program storage device readable by a machine according to claim 23, further including determining a centroid of a segment using itemsets contained in said segment and refining the seeds in an iterative process.

28. The program storage device readable by a machine according to claim 26, wherein said refining step includes the step of redistributing transactions in cluster segments below said minimum mass requirement to different clusters exceeding said minimum mass requirement.

29. The program storage device readable by a machine according to claim 20, wherein said received request includes a specified support and confidence measure, said personalized association rules generated in accordance with said specified support and confidence measure.

* * * * *